United States Patent [19]

Kohlmeier et al.

[11] Patent Number: 5,253,919
[45] Date of Patent: Oct. 19, 1993

[54] ARRANGEMENT FOR THE DAMPING OF TORSIONAL VIBRATIONS

[75] Inventors: Hans-Heinrich Kohlmeier, Mönsheim; Rainer Joest, Mühlacker, both of Fed. Rep. of Germany; Christophe Liefooghe, Hove, Belgium; Heinz Bayer, Ulm, Fed. Rep. of Germany; Hermann Burst, Rutesheim, Fed. Rep. of Germany

[73] Assignee: Dr. Ing. h.c.F. Porsche AG, Fed. Rep. of Germany

[21] Appl. No.: 769,367

[22] Filed: Oct. 1, 1991

[30] Foreign Application Priority Data

Oct. 1, 1990 [DE] Fed. Rep. of Germany ....... 4030990

[51] Int. Cl.[5] .................... B60J 1/02; B60R 27/00
[52] U.S. Cl. .................... 296/96.21; 188/379; 280/758
[58] Field of Search .............. 296/96.21, 186, 203, 296/210; 280/758, 782, 784; 188/379, 380; 267/136, 141; 248/559

[56] References Cited

U.S. PATENT DOCUMENTS

| | | | |
|---|---|---|---|
| 1,380,996 | 6/1921 | Martin | 296/96.21 X |
| 4,588,206 | 5/1986 | Powers | 280/758 |
| 5,072,801 | 12/1991 | Freymann et al. | 180/68.5 |

FOREIGN PATENT DOCUMENTS

| | | |
|---|---|---|
| 3125830 | 2/1983 | Fed. Rep. of Germany . |
| 3632418 | 3/1988 | Fed. Rep. of Germany . |
| 2445776 | 8/1980 | France ............ 296/96.21 |

*Primary Examiner*—Johnny D. Cherry
*Assistant Examiner*—Andrew C. Pike
*Attorney, Agent, or Firm*—Evenson, Wands, Edwards, Lenahan, McKeown

[57] ABSTRACT

A damper is provided on a convertible for the damping of bodyside torsional vibrations in the area of the windshield frame. This damper is arranged particularly on the frame of the windshield and is held by way of elastic slide bearings. The damper is arranged in the open at a distance from the frame and can swing relatively freely in the transverse directions of the vehicle so that natural torsional frequencies of the vehicle on the frame are damped.

17 Claims, 3 Drawing Sheets

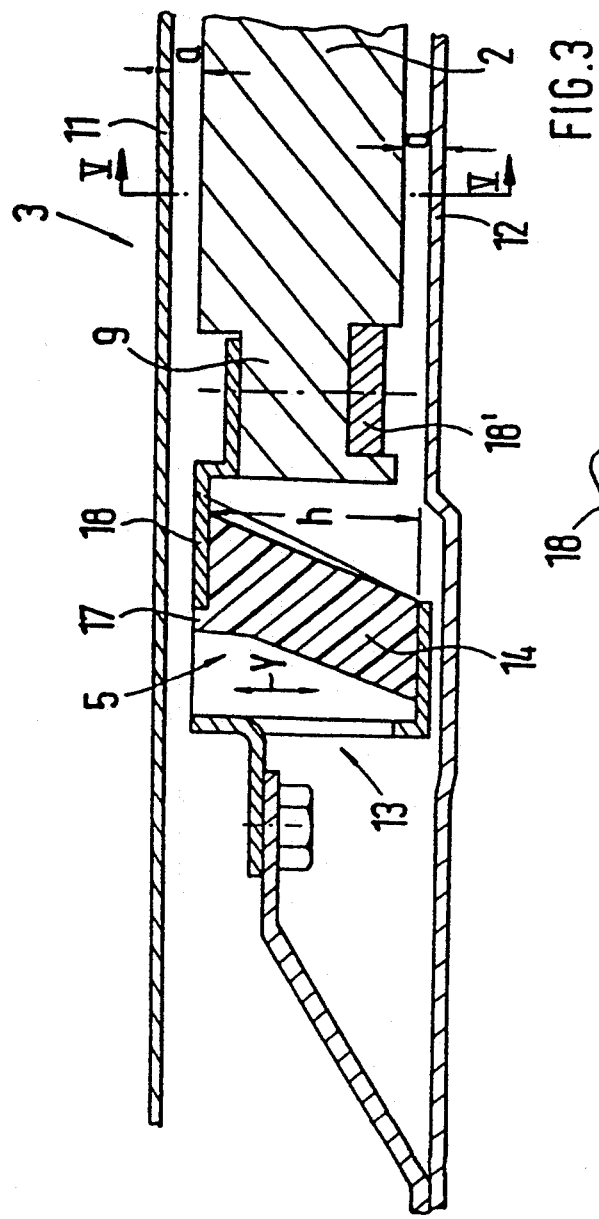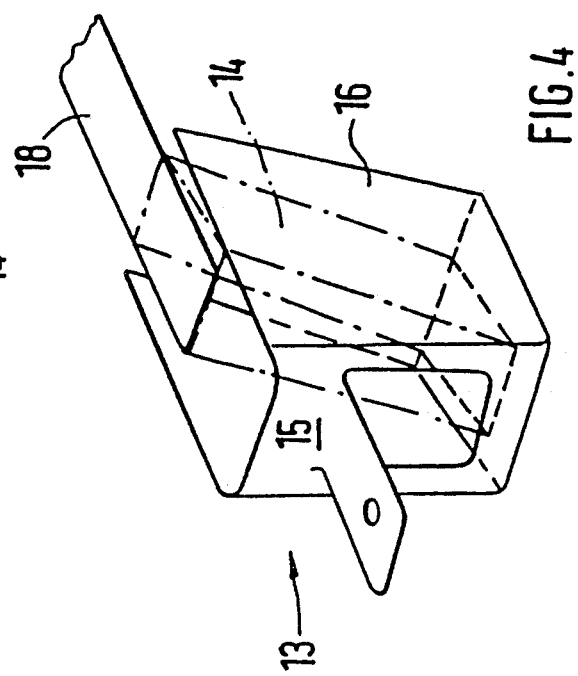

ARRANGEMENT FOR THE DAMPING OF TORSIONAL VIBRATIONS

BACKGROUND AND SUMMARY OF THE INVENTION

The invention relates to an arrangement for the damping of torsional vibrations.

In the case of vehicles constructed as convertibles, as a result of the structure and therefore the lower torsional rigidity in comparison to hard top coupes, natural torsional vibrations occur which cause such vibrations and vibrational deflections, particularly in the area of the windshield, that the rear view mirror fastened to the windshield carries out such vibrations making it difficult to view in the rearward direction through the mirror.

In the field of vehicle construction, vibration dampers are known for various applications, thus, for example, on the drive shaft (German Patent Document DE-OS 36 32 418) and on drive units (German Patent Document DE-PS 31 25 830). These dampers are held in elastic bushings which, because of space conditions, may take up an installation space which is necessary for an optimal damping of vibrations.

It is an object of the invention to provide a vibration damper in a convertible which ensures an optimally adapted damping of vibrations to natural torsional frequencies of the vehicle.

According to the invention, this object is achieved by providing an arrangement for the damping of body-side torsional vibrations on a convertible, comprising a damper held elastically by way of elastic slide bearings on a frame of a windshield and arranged at a distance from the frame so that it can relatively freely swing in the transverse direction of the vehicle, the slide bearings each having a maximal height damping the natural torsional frequency of the vehicle in the are of the frame.

The principal advantages achieved by the invention are that the vibrations on the frame of the windshield can be reduced by way of a metallic mass damper to such an extent that an unimpaired rear view is permitted through the mirror fastened to the windshield or to the frame. In addition, the remaining vibrational behavior is markedly improved particularly in the area of the dashboard with the steering wheel.

Depending on the construction of the vehicle or of the windshield frame, the damper is held inside this frame between connected profiled struts or outside the frame elastically by way of bearings. The damper is fastened to the upper frame of the windshield and, because of the very crowded space conditions, for the optimal damping of the vibrations, elastic slide bearings are required that have a height which corresponds approximately to the height of the damper or of the clearance height of the connected profiled struts.

The elastic bearings are preferably arranged on the two free ends of the damper mass and are connected with their one lower end to a profiled strut and with their other upper end with the mass of the damper so that an optimal length of the elastomer body can be achieved. By means of this arrangement of the bearing, a bearing is advantageously achieved which is statically acted upon by pressure and which has a favorable effect with respect to fatigue strength for the damping of natural torsional frequencies in the area of the windshield frame.

On each free end, the damper mass may also be encompassed by a holder, the projecting leg of which is connected with the elastomer body of the bearing and which is connected with a bracket which has lateral longitudinal stops and front-side transverse stops.

Other objects, advantages, and novel features of the present invention will become apparent from the following detailed description of the invention when considered in conjunction with the accompanying drawings.

BRIEF DESCRIPTION OF THE DRAWINGS

FIG. 3 is a sectional schematic view of an arrangement of a vibration damper according in an upper window frame along section line III—III of FIG. 2 with an end-side elastic bearing, only one half of the damper being shown;

FIG. 4 is a diagrammatic representation of a detail of the bracket for the elastomer body of the vibration damper of FIG. 3;

DETAILED DESCRIPTION OF THE DRAWINGS

Figure 1:
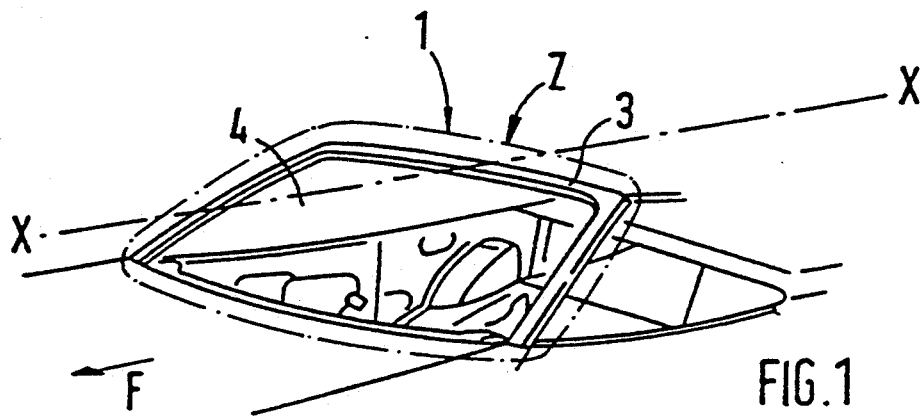
FIG. 1 is a schematic representation of an installation site of a vibration damper in accordance with preferred embodiments of the present invention.
Figure 2:
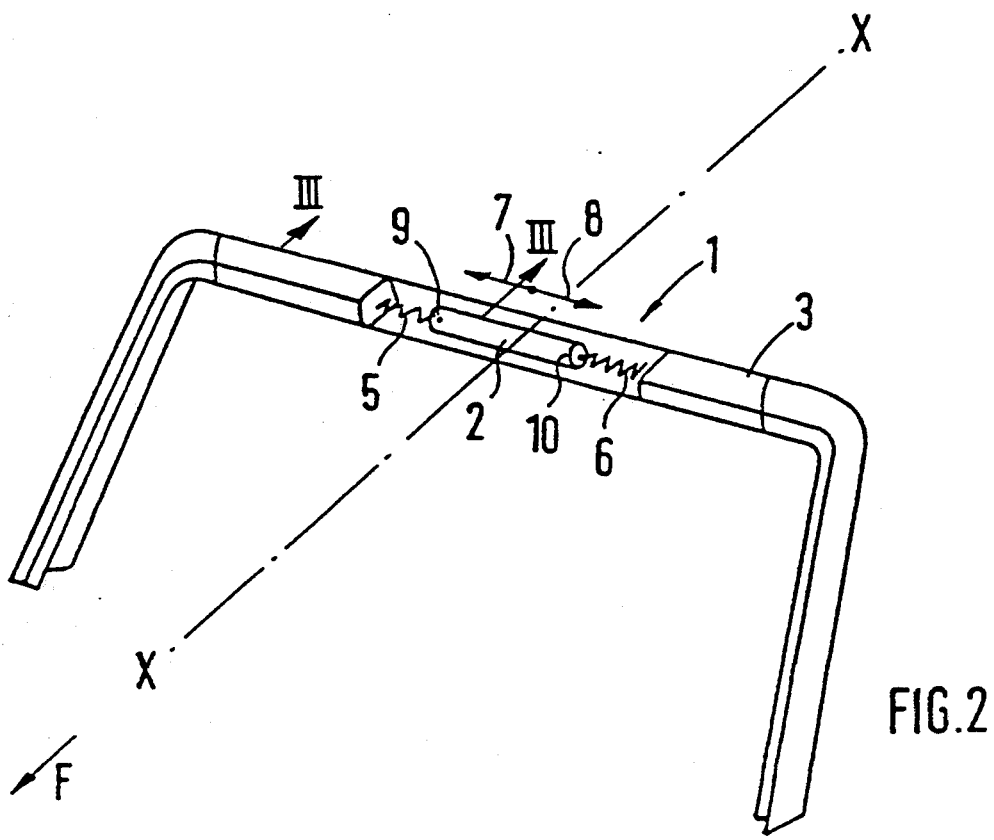
FIG. 2 is an enlarged schematic representation of detail Z of the vibration damper in the upper window frame according to FIG. 1.

The arrangement 1 for the damping of torsional vibrations comprises essentially a damper 2 on the upper window frame 3 or on the roof frame of a windshield 4 which is arranged in elastic bearings 5 and 6 so that it can be moved in an approximately horizontally swinging manner in the directions of the arrows 7 and 8. The damper 2 is made of a metallic material with a specific gravity which is as high as possible, as, for example, steel, lead, or a similar material and, at the end side, that is, on its free ends 9 and 10, is held in the elastic bearings 5 and 6. More than two bearings may also be provided for the fastening of the damper 2. These bearings may then be arranged so that they are, for example, distributed along the length of the damper.

Figure 5:
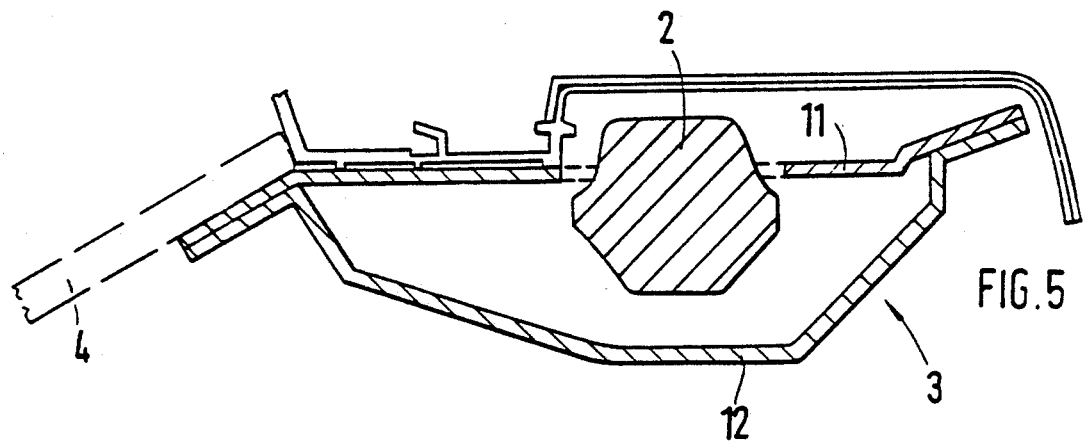
FIG. 5 is a cross-sectional view of the upper window frame of a windshield with dampers encapsulated between two profiled struts, taken along section V—V of FIG. 3 and constructed in accordance with a preferred embodiment of the invention.
Figure 6:
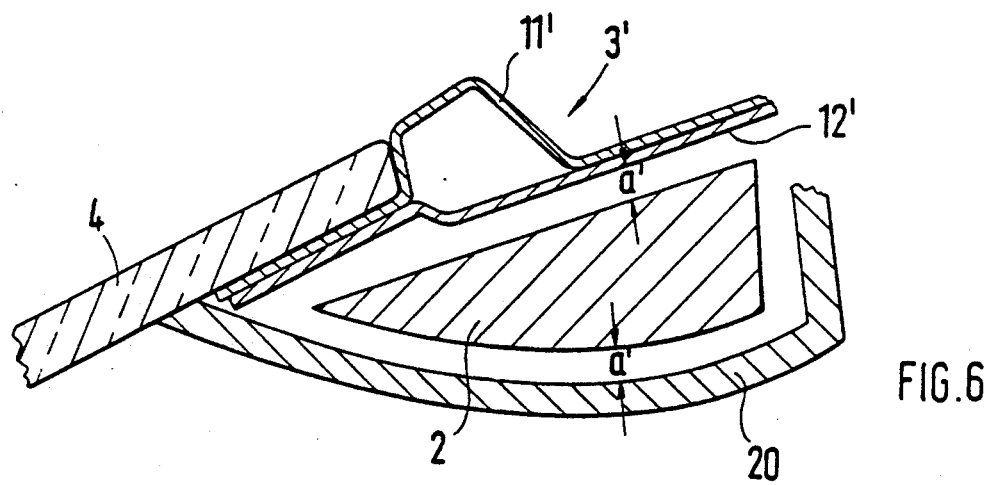
FIG. 6 is cross-sectional view similar to FIG. 5 and showing another preferred embodiment of the invention with a fitted-on damper which is covered on the bottom side by way of a screen.

The damper 2 is arranged symmetrically with respect to the longitudinal center axis X—X of the vehicle inside the frame 3 (FIGS. 3, 4, and 5) or outside the frame 3' (FIG. 6). The installation site of the damper 2 depends on the construction of the frame; i.e., when the space for the housing of the damper 2 with the elastic bearings 5 and 6 between the profiled struts 11 and 12 of the frame 3 is sufficient, an inside arrangement is provided, as shown in detail in FIGS. 3 and 5. In contrast, an exterior arrangement of the damper 2 takes place when no space exists between the profiled struts 11', 12', as shown by the construction according to FIG. 6. In the case of this damper 2 of FIG. 6, a central bearing is provided by way of a slide bearing according to FIG. 3. On the free ends of the damper, bearings are arranged which are aligned in a horizontal plane and which have a higher stiffness in the longitudinal direction (driving direction F) than in the transverse direction.

The bearings 5 and 6 of the damper 2 are constructed as elastic slide bearings and are statically acted upon by pressure. For the optimal damping of the natural torsional frequencies of the vehicle and for ensuring the service life, they have a certain height which corresponds approximately to the clearance height between the profiled struts 11 and 12 of the windshield frame 3.

As shown in detail in FIGS. 3 and 4, a bracket 13 is provided for the receiving and the fastening of the bearings 5 and 6 which virtually encloses the elastomer body 14 of the bearings, and the front wall 15 of which forms a transverse stop and the two lateral walls 16 of which form longitudinal stops. The elastomer body 14 is connected by way of a projecting holder 18 with the damper 2 on its end 17 disposed opposite the fastening on the bracket 13. The holder 18 and of another holder 18' receive and hold the free end 9 of the damper 2 and between one another.

The damper 2 has the purpose of damping the natural torsional frequency of the convertible which results in a vibration in the transverse direction of the vehicle on the upper frame 3. For this purpose, the damper mass, on the one hand, is held in bearings 5 and 6 of a defined elasticity and, on the other hand, a clearance of a distance "a" exists between the profiled struts 11 and 12 so that a disadvantageous abutting on the profiled struts is prevented. In a similar manner a distance "a" exists between profiled struts 11', 12' of the FIG. 6 embodiment. In particular, the bearings have a softer characteristic in the transverse direction than in the vertical direction Y over the height h of the bearing. A movement of the damper in the transverse direction (direction of the arrows 7, 8) can result in a difference of up to 20 mm with respect to the inoperative position.

In the case of an exterior arrangement of the damper according to FIG. 6, this damper is covered by means of an additional screen 20 which, at the same time, serves as a catching device for the damper 2.

The damper 2 is preferably constructed in one piece and is adapted to the contour course of the frame 3, 3'; that is, the damper 2 is adapted to the course of the frame 3, 3' so that an exposure (spacing) is ensured.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for damping of body-side torsional vibrations on a convertible vehicle comprising a damper held elastically by way of a elastic slide bearings on a frame of a windshield and arranged at a distance from the frame so that the damper can relatively freely swing in a transverse direction of the vehicle, the slide bearings each having a maximal height damping a natural torsional frequency of the vehicle in an area of the frame.

2. An arrangement according to claim 1, wherein the damper comprises a one-piece metallic mass body which is elastically supported by at least one of the slide bearings arranged on a free end of the mass body.

3. An arrangement according to claim 2, wherein the mass body of the damper consists of lead.

4. An arrangement according to claim 2, wherein the slide bearings of the damper have a softer characteristic in transverse directions than in a vertical direction.

5. An arrangement according to claim 2, wherein the frame of the windshield includes an upper frame member, and wherein the sampler is arranged symmetrically with respect to a longitudinal center axis of the vehicle on the upper frame member extending approximately in a horizontal plane.

6. An arrangement according to claim 1, wherein the slide bearings of the damper have a softer characteristic in transverse directions than in a vertical direction.

7. An arrangement according to claim 6, wherein the damper is arranged in an elastically disposed manner inside the frame of the windshield composed of two profiled struts with the struts enclosing the damper in an encapsulating manner.

8. An arrangement according to claim 6, wherein the damper is arranged outside the windshield frame composed of two profiled struts and is covered by a screen toward an interior space of the vehicle.

9. An arrangement according to claim 6, wherein the frame of the windshield includes an upper frame member, and wherein the damper is arranged symmetrically with respect to a longitudinal center axis of the vehicle on the upper frame member extending approximately in a horizontal plane.

10. An arrangement according to claim 6, wherein holders reach around free ends of the damper, one holder being connected with an elastomer body of one of the slide bearings and being arranged in a bracket fastened to a profiled strut of the frame.

11. An arrangement according to claim 1, wherein the damper is arranged in an elastically disposed manner inside the frame of the windshield composed of two profiled struts with the struts enclosing the damper in an encapsulating manner.

12. An arrangement according to claim 11, wherein holders reach around free ends of the damper, one holder being connected with an elastomer body of one of the slide bearings and being arranged in a bracket fastened to one of the profiled strut of the frame.

13. An arrangement according to claim 12, wherein the bracket has a rear wall constructed as a transverse stop as well as lateral walls constructed as longitudinal stops for the elastomer body.

14. An arrangement according to claim 1, wherein the damper is arranged outside the windshield frame composed of two profiled struts and is covered by a screen toward an interior space of the vehicle.

15. An arrangement according to claim 1, wherein the frame of the windshield includes an upper frame member, and wherein the damper is arranged symmetrically with respect to a longitudinal center axis of the vehicle on the upper frame member extending approximately in a horizontal plane.

16. An arrangement according to claim 1, wherein holders reach around free ends of the damper, one holder being connected with an elastomer body of one of the slide bearings and being arranged in a bracket fastened to a profiled strut of the frame.

17. An arrangement according to claim 16, wherein the bracket has a rear wall constructed as a transverse stop as well as lateral walls constructed as longitudinal stops for the elastomer body.

* * * * *